United States Patent
Sarno et al.

(10) Patent No.: US 11,431,491 B2
(45) Date of Patent: Aug. 30, 2022

(54) PROTECTION OF THE EXECUTION OF CIPHER ALGORITHMS

(71) Applicant: STMicroelectronics (Rousset) SAS, Rousset (FR)

(72) Inventors: Thomas Sarno, Fuveau (FR); Yanis Linge, Fuveau (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 127 days.

(21) Appl. No.: 16/903,209

(22) Filed: Jun. 16, 2020

(65) Prior Publication Data

US 2020/0396068 A1    Dec. 17, 2020

(30) Foreign Application Priority Data

Jun. 17, 2019   (FR) ...................................... 1906485

(51) Int. Cl.
*H04L 9/08* (2006.01)
*H04L 9/06* (2006.01)

(52) U.S. Cl.
CPC .......... *H04L 9/0861* (2013.01); *H04L 9/0625* (2013.01); *H04L 9/0819* (2013.01); *H04L 9/0894* (2013.01); *H04L 2209/08* (2013.01)

(58) Field of Classification Search
CPC ... H04L 9/0861; H04L 9/0625; H04L 9/0819; H04L 9/0894
USPC ........................................................ 713/189
See application file for complete search history.

(56) References Cited

U.S. PATENT DOCUMENTS 10,187,200 B1 *   1/2019   Firestone .............. H04L 9/0869
2017/0026169 A1 *   1/2017   Sugahara ................. G09C 1/00

OTHER PUBLICATIONS

Itoh, Kouichi, Masahiko Takenaka, and Naoya Torii. "DPA countermeasure based on the "masking method"." International Conference on Information Security and Cryptology. Springer, Berlin, Heidelberg, 2001. (Year: 2001).*
Itoh et al., "DPA Countermeasure Based on the "Masking Method"", Electronic Publishing, Artistic Imaging, and Digital Typography, vol. 2288, 2001, pp. 440-456.
Mangard, "A Simple Power Analysis (SPA) Attack on Implementations of the AES Key Expansion", *12 th European Conference on Computer Vision, ECCV 2012*, 2003, pp. 343-358.

* cited by examiner

*Primary Examiner* — Kambiz Zand
*Assistant Examiner* — Phuc Pham
(74) *Attorney, Agent, or Firm* — Seed Intellectual Property Law Group LLP (57) ABSTRACT

Systems and methods for protecting secret or secure information involved in generation of ciphered data by circuitry. The circuitry includes data paths and key paths that operate to perform cipher operations to generate a plurality of key shares and a plurality of data shares using a key and data as input. The data and the key may be masked by at least one mask. The plurality of key shares may be generated using the key and a first mask. The plurality of data shares are generated using key shares, the data, and a second mask.

24 Claims, 5 Drawing Sheets

PROTECTION OF THE EXECUTION OF CIPHER ALGORITHMS

BACKGROUND

Technical Field

The present disclosure generally relates to electronic circuits and, more specifically, to circuits executing symmetric encryption algorithms. The present disclosure more specifically relates to the protection of the execution of algorithms of symmetric encryption in rounds against side-channel attacks.

Description of the Related Art

In many applications, electronic circuits implement cipher, authentication, signature calculation algorithms, and more generally algorithms manipulating data, called secret data or secure data. Secret data may be considered as being data to which access is desired to be reserved to certain users or circuits. There in particular exist symmetric encryption algorithms or secret key algorithms, which enable to cipher and to decipher messages using a same cryptographic key.

There exist many methods, called attacks, to attempt discovering or hacking secret data manipulated by such algorithms. Among such attacks, so-called side-channel attacks use information such as the power consumption of the circuit (SPA, DPA attacks), the electromagnetic radiation generated thereby, etc. The interpretation of such information provides the hacker with information relative to the secret data, which can be used to access the secret data or determine potentially sensitive information regarding operation of the system.

BRIEF SUMMARY

It may be desirable to improve the protection of data manipulated by symmetric encryption algorithms against side-channel attacks.

Embodiments disclosed herein may facilitate overcoming all or part of the disadvantages of usual methods and circuits of protection of data manipulated by symmetric encryption algorithms against side-channel attacks.

An embodiment provides a method of protecting the execution, by an electronic circuit, of a symmetric cipher algorithm in rounds of a data by a key, wherein:

at least one among the data and the key is masked by at least one mask; and a round function is applied, at each round of the cipher algorithm, to the masked key or data and to said mask.

According to some embodiments:

said data and said key are masked by at least one mask; and said round function is applied, at each round of the cipher algorithm, to the masked key, to the masked data, and to said mask.

According to some embodiments, said mask or masks are randomly selected.

According to some embodiments, the number of applications of the round function to a data share among the masked key and said data mask is, at any time, smaller than the number of applications of the round function to a key share among the masked key and said key mask.

According to some embodiments, for a round of same rank, the number of applications of the round function to a data share among the masked key and said data mask is smaller than or equal to the number of applications of the round function to a key share among the masked key and said key mask.

According to some embodiments, the round function is, for a round of same rank, successively applied to all the key shares and then to all the data shares.

According to some embodiments, the round function is, for a round of same rank, alternately applied to a key share and then to a data share.

According to some embodiments, the round function uses, at each round of the cipher algorithm:

one key share among the masked key and said key mask to cipher a data share among the masked data and said data mask; and the other key share among the masked key and said key mask to cipher the other data share among the masked data and said data mask.

According to some embodiments, the key share used to cipher each data share is, at each round of the cipher algorithm, randomly selected.

According to some embodiments, a plurality of different hardware entities apply the round function to the masked key, to said key mask, to the masked data, and to said data mask.

According to some embodiments, the hardware entities applying the round function are, at each round of the cipher algorithm, randomly selected.

According to some embodiments, the hardware entities perform a calculation independent from the cipher algorithm when they do not apply the round function.

According to some embodiments, the key is masked by a plurality of key masks and the data are masked by a plurality of data masks.

Some embodiments provide an electronic circuit configured to implement such method.

A system according to the present disclosure may be summarized as comprising a plurality of circuits that, in operation execute cryptographic operations to generate cryptographic information and protect secret data associated with the cryptographic operations. The plurality of circuits are configured, in connection with protection of the secret data, to generate a first plurality of key shares by performing block cipher operations involving a masked cryptographic key; generate a second plurality of key shares by performing block cipher operations involving a first mask; generate a first plurality of data shares by performing block cipher operations involving masked data and the first plurality of key shares; and generate a second plurality of data shares by performing block cipher operations involving a second mask and the second plurality of key shares.

The first plurality of key shares may be generated by a first circuit of the plurality of circuits. The second plurality of key shares may be generated by a second circuit of the plurality of circuits. The first plurality of data shares may be generated by a third circuit of the plurality of circuits. The second plurality of data shares may be generated by a fourth circuit of the plurality of circuits. The first plurality of key shares, the second plurality of key shares, the first plurality of date shares, and the second plurality of data shares may be generated via a plurality of block cipher operations. One or more individual circuits of the plurality of circuits may be configured to perform a dummy operation in parallel with performance of a block cipher operation by at least one other circuit of the plurality of circuits. The plurality of circuits in operation may generate a third plurality of key shares by performing block cipher operations involving a third mask; and generate a third plurality of data shares by performing block operations involving a fourth mask and the third plurality of key shares. The first plurality of key shares, the second plurality of key shares, the first plurality of data shares, and the second plurality of data shares may be generated by randomly selected circuits of the plurality of circuits.

A device according to the present disclosure may be summarized as including a plurality of processing circuits that operate in parallel to generate ciphered data of a data block; and protect secret data. The plurality of processing circuits are configured, as part of protection of the secret data, to generate a plurality of key shares using a cryptographic key as input to a first plurality of iterative cipher operations and using a first mask as input to a second plurality of iterative cipher operations; generate a first plurality of data shares using a data block and a first key of the plurality of key shares as input to a third plurality of iterative cipher operations; and generate a second plurality of data shares using a second mask and a second key the plurality of key shares as input to a fourth plurality of iterative cipher operations. For each cycle of iterative cipher operations in which one or more circuits of the plurality or processing circuits performs cipher operations, remaining circuits of the plurality of processing circuits may perform dummy operations in parallel with performance of the cipher operations by one or more circuits. The plurality of processing circuits may be configured to combine one data share of the first plurality of data shares and one data share of the second plurality of data shares to generate the ciphered data.

A method according to the present disclosure may be summarized as comprising executing cryptographic operations to generate cryptographic information and protecting secret data associated with the cryptographic operations. The protecting includes generating, by a first circuit, a first plurality of key shares by performing block cipher operations involving a cryptographic key; generating, by a second circuit, a second plurality of key shares by performing block cipher operations involving a first mask; generating, by a third circuit, a first plurality of data shares by performing block cipher operations involving a data block and the first plurality of key shares; and generating, by a fourth circuit, a second plurality of data shares by performing block cipher operations involving a second mask and the second plurality of key shares.

The method may comprise generating the cryptographic information by at least combining one data share of the first plurality of data shares and one data share of the second plurality of data shares. The cryptographic key may be a masked cryptographic key generated using the first mask and an unmasked cryptographic key, and the data block may be masked data generated using the second mask. The method may comprise performing a first dummy operation by the second circuit in parallel with generating a key share of the first plurality of key shares by the first circuit. The method may comprise performing a second dummy operation by the fourth circuit in parallel with generating a data share of the first plurality of data shares by the third circuit.

The method may comprise generating, by a fifth circuit, a third plurality of key shares by performing block cipher operations involving a third mask; and generating, by a sixth circuit, a third plurality of data shares by performing block cipher operations involving a fourth mask and the third plurality of key shares. The method may comprise generating the cryptographic information by at least combining one data share of the first plurality of data shares, one data share of the second plurality of data shares, and one data share of the third plurality of data shares.

Generating the second plurality of key shares may be performed subsequent to generating an initial key share of the first plurality of key shares. Generating an initial data share of the first plurality of data shares may be performed subsequent to generating an initial key share of the second plurality of key shares. Generating an initial data share of the first plurality of data shares may be performed subsequent to generating the initial key share of the first plurality of key shares. One or more of the second plurality of key shares are generated in parallel with one or more of the first plurality of key shares. One or more of the second plurality of data shares may be generated in parallel with one or more of the first plurality of data shares.

BRIEF DESCRIPTION OF THE DRAWINGS

The foregoing and other features and advantages of the present disclosure will be discussed in detail in the following non-limiting description of specific embodiments and implementation modes in connection with the accompanying drawings, among which.

DETAILED DESCRIPTION

The same elements have been designated with the same reference numerals in the different drawings unless otherwise indicated by the context of the disclosure. In particular, the structural and/or functional elements common to the different embodiments and implementation modes may be designated with the same reference numerals and may have identical structural, dimensional, and material properties.

For clarity, only those steps and elements which are useful to the understanding of the described embodiments and implementation modes have been shown and will be detailed. In particular, the applications of the executed algorithms or of the circuits executing them have not been detailed, the described embodiments and implementation modes being compatible with usual applications.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more intermediate elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

The terms "about", "substantially", and "approximately" are used herein to designate a tolerance of plus or minus 10% of the value in question, as one example, or of plus or minus 5% of the value in question, as another example.

Figure 1:
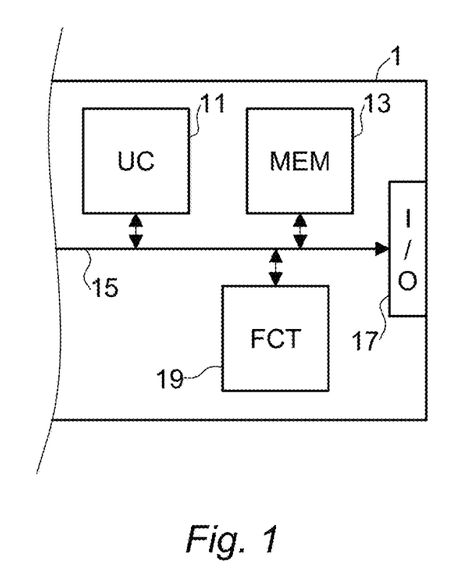
FIG. 1 schematically shows an embodiment of an electronic circuit.

FIG. 1 schematically shows an embodiment of an electronic circuit 1.

According to this embodiment, circuit 1 comprises:

Processing circuitry 11 (UC) which may be, by way of non-limiting example, a state machine, a microprocessor, a programmable logic circuit, etc.;

one or a plurality of volatile and/or non-volatile storage areas 13 (MEM) for storing all or part of data and keys;

one or a plurality of data, address, and/or control buses 15 between the different elements internal to circuit 1; and an input-output interface 17 (I/O) for communicating with the outside of circuit 1.

Circuit 1 may include various other circuits according to the application, symbolized in FIG. 1 by a block 19 (FCT).

Figure 2:
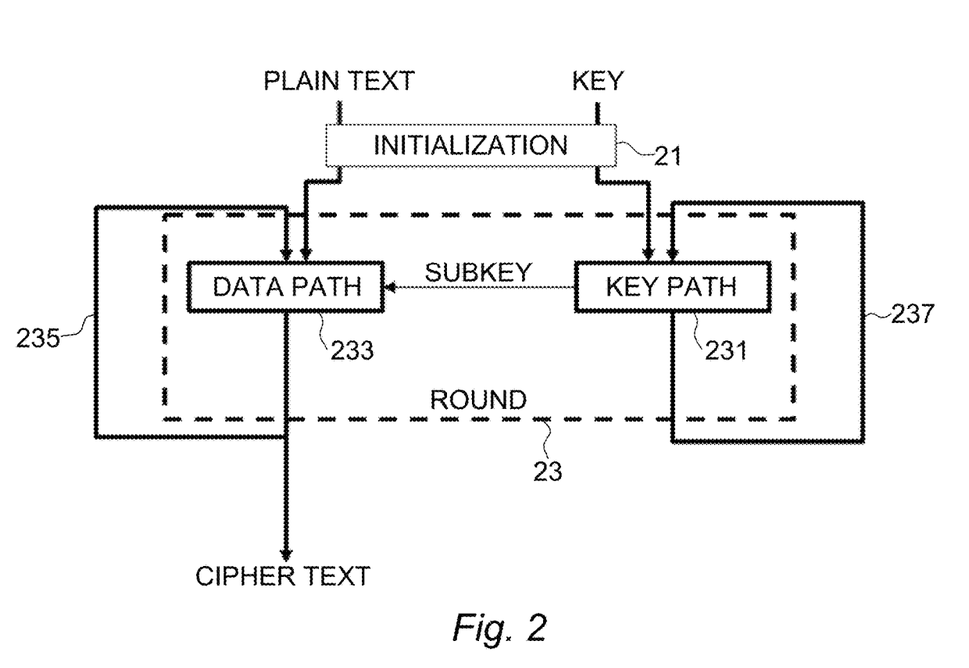
FIG. 2 shows, in the form of blocks, a schematic diagram of the execution of an embodiment of a symmetric cipher algorithm.

FIG. 2 shows, in the form of blocks, a schematic diagram of the execution of an embodiment of a symmetric cipher algorithm, such as block cipher algorithms and stream cipher algorithms. The present disclosure relates to performance of block cipher algorithms in successive rounds or iterations, for example, algorithms of AES, SM4, etc., type.

A symmetric encryption or cipher algorithm (e.g., a block cipher algorithm) may be executed by the electronic circuit 1 in rounds to transform data (e.g., a message, plain alphanumeric text) with a secret key to obtain ciphered data (e.g., a ciphered message, ciphered alphanumeric text). The electronic circuit 1 executing the cipher algorithm may be a state machine or a processor that is specifically configured to execute the symmetric encryption or cipher algorithm. Such specific configuration may be achieved via specific configuration of a programmable logic circuit, field programmable gate array, application specific integrated circuit, system on a chip, etc., for example, that are included in the circuit 1.

Block cipher algorithms generally provide a first so-called initialization step (block 21, INITIALIZATION). The initialization step enables to perform operations prior to the actual ciphering. In the example of a block cipher algorithm, the plain text or text (PLAIN TEXT) is typically, during initialization step 21, divided, broken down or split into blocks having a fixed size (for example, 64 or 128 bits). If the data to be ciphered occur to have a size which is not a multiple of the size of a block, at least one block (for example, the last block) can then be completed with as many bits or bytes to fill the block. The secret key (KEY) used to cipher the data is generally selected or calculated or generated at the time of initialization step 21.

Once initialization step 21 is over, an iterative ciphering or processing process is then started (block 23, ROUND). The iterative processing comprises applying, to each of the blocks forming the plain text and to the secret key, successive transformations. At each round or iteration 23, it is started by calculating or generating (block 231, KEY PATH) a subkey (SUBKEY) from the secret key or the subkey of the previous round.

Then, the subkey is used to transform or cipher (block 233, DATA PATH) each of the blocks forming the data. New blocks having a size identical to that of the blocks forming the plain text are then obtained at the output of a round. The new blocks are then injected back (arrow 235) into the processing or cipher process, thus playing the role, at the next round, of input data for the application of round function 23. Similarly, each new subkey is, at the output of a round, injected back (arrow 237) to enable to generate the subkey of the next round.

At the end of a number N of rounds, the blocks obtained by the last application of round function 23 form the ciphered or encrypted message (CIPHER TEXT).

In other words, the algorithm or process of symmetric cipher in rounds successively comprises, in addition to the initialization step:

a first round, during which round function 23 is applied to the blocks forming the plain text and to the key;

a number of intermediate rounds (N−2 rounds in the present example), for each of which a new subkey is calculated, and during which round function 23 is applied to the blocks and to the subkey resulting from the application of the function at the previous round; and a final round, at the end of which the processing of the data blocks, by a last application of round function 23, provides the ciphered data.

Number N of rounds is also called number of iterations. Number N of rounds generally depends on the respective sizes of the blocks and on the secret key. The round function 23, applied at each round is, for example, comprised of substitution, row shifting, and column mixing operations followed by a combination (for example, XOR) with the subkey of the considered round. Round function 23 typically aims at obtaining an algorithm provided with properties of confusion (that is, as complex a relation as possible between the secret key and the plain text) and of diffusion (that is, a dissipation, in the statistics of the ciphered text, of a statistic redundancy of the plain text). Such is typically the case for an AES- or SM4-type algorithm.

Figure 3:
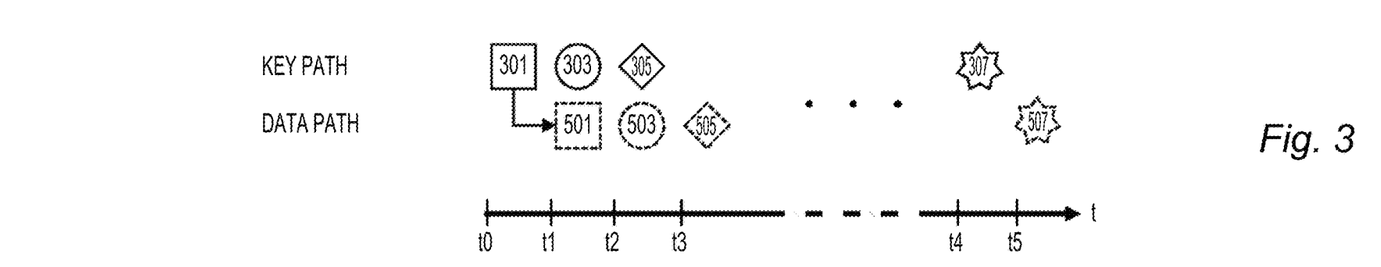
FIG. 3 schematically shows steps of execution of a symmetric cipher algorithm.

FIG. 3 schematically shows steps of execution of a symmetric cipher algorithm.

In the example of FIG. 3, a sequence, over time (t), of successive steps of a symmetric cipher algorithm in rounds, for example, the algorithm discussed in relation with FIG. 2, is considered. It is assumed that the cipher algorithm comprises a number N of rounds. The rounds are, hereafter, numbered from 1 to N. In this example, the initialization step (21, FIG. 2) is not taken into account.

FIG. 3 shows:

by blocks in full line, forming a first row (KEY PATH), the successive applications of the round function to the secret key; and by blocks in dotted lines, forming a second row (DATA PATH), the successive applications of the round function to the plain text.

In the example of FIG. 3, each block thus represents an application of the round function to the key or to the blocks forming the data to be ciphered, as discussed in relation with FIG. 2. The applications of the round function to the key and the applications of the round function to the data are, most of the time, carried out by two different hardware entities (not shown) or physical units. In other words, a hardware entity is assigned to the calculation of the subkey specific to each round while another different hardware entity is dedicated to the ciphering of the data. As a non-limiting example, a computing system, such as the circuit 1, includes a processing unit (e.g., included in the processing circuitry 11) comprising a plurality of individual processing circuits or processor cores that each, in operation, process information independently from and in parallel with each other. The individual processing circuits may be referred to herein as hardware entities. Individual processing circuits may be tasked with either application of round functions to the key or application of round functions to the blocks forming the data. In some implementations, the computing system may be configured to assign tasks (e.g., cipher operations) to individual processing circuits. As another non-limiting example, a computing system may include a plurality of processing units each comprising the aforementioned individual processing circuits. The plurality of individual processing circuits or processor cores may be contained in a single integrated circuit.

At a time t0, a first round of the cipher algorithm starts. The hardware entity dedicated to the calculation of the subkeys applies (block 301) the round function to the secret key. A first subkey is thus obtained. The hardware entity dedicated to the ciphering of the data remains generally inactive during the calculation 301 of the first subkey.

At a time t1, the round function is applied (block 501) to the plain text by the hardware entity dedicated to the data ciphering. This thus enables to perform a first ciphering 501 of the plain text by using the first subkey resulting from calculation 301. Once first ciphering 501 is over, the first round of the algorithm ends. In parallel with the execution of first round 501 applied to the data, a second round of the cipher algorithm starts by the application (block 303) of the round function to the first subkey resulting from calculation 301. A second subkey is thus obtained.

At a time t2, the round function is applied (block 503) to the data originating from the first ciphering 501, by means of the first subkey, of the plain text. This thus enables to perform a second ciphering 503 of the data by means of the second subkey resulting from calculation 303. Once this second ciphering 503 is over, the second round of the algorithm ends. In parallel with the execution of the second round 503 applied to the data, a third round of the cipher algorithm starts by the application (block 305) of the round function to the second subkey resulting from calculation 303. A third subkey is thus obtained.

At a time t3, the round function is applied (block 505) to the data originating from the second ciphering 503, by means of the second subkey, of the data. This thus enables to perform a third ciphering 505 of the data by means of the third subkey resulting from calculation 305. Once this third ciphering 505 is over, the third round of the algorithm ends. In parallel with the execution of third round 505 applied to the data, a fourth round of the cipher algorithm starts by the application (not shown) of the round function to the third subkey resulting from calculation 305. A fourth subkey is thus obtained.

The steps of execution of the cipher algorithm thus follow one another until a time t4 when the last (N-th) subkey is calculated (block 307).

At a time t5, the recursive cipher process ends by a final application (block 507) of the round function to the data. The data obtained at the end of the last ciphering 507, by means of the N-th key, then form the ciphered data. The hardware entity assigned to the calculation of the subkeys remains generally inactive during the last application 507 of the round function to the data.

In the example of FIG. 3, the time sequence of the steps of the cipher algorithm extends over a time period theoretically equal to N+1 multiplied by the time taken for the application of the round function to the data or to the key.

An execution similar to that which has just been described in relation with FIG. 3 has the disadvantage of directly manipulating the plain text during the first round of the cipher algorithm. This makes the execution particularly vulnerable to side-channel attacks, which may enable an attacker or hacker to trace back secret information (for example, the plain text) manipulated by a circuit, for example, circuit 1 (FIG. 1).

Figure 4:
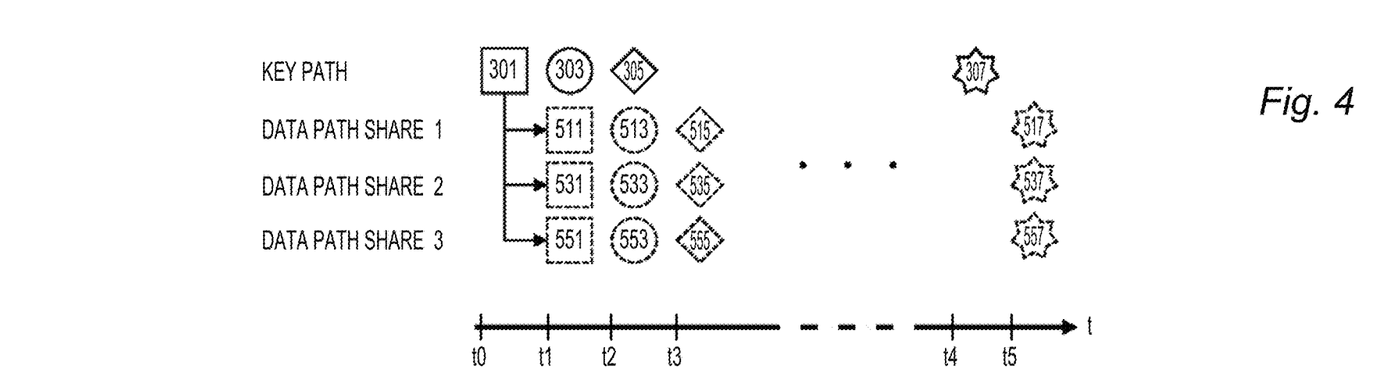
FIG. 4 schematically shows an example of a method of protection of the execution of a symmetric cipher algorithm.

FIG. 4 schematically shows an example of a method of protection of the execution of a symmetric cipher algorithm.

In the example of FIG. 4, the plain text is first masked before being ciphered by the execution of the algorithm. The masking of the plain text is performed, for example, by combining the plain text, noted X, with two numbers, noted R1 and R2. Numbers R1 and R2 are generally randomly selected. The masking of plain text X by random numbers R1 and R2 enables to secure the execution of the cipher algorithm by avoiding directly manipulating plain text X.

A sharing of data X into three data shares is thus obtained. In other words, three data shares, defined as follows, are obtained:

masked data, noted X0, obtained by combination of plain text X with random numbers R1 and R2 (for example, X0=X XOR R1 XOR R2, where "XOR" designates the exclusive or operator);

a first data mask, equal to random number R1; and a second data mask, equal to random number R2.

A time variation of the steps of a symmetric cipher algorithm in rounds, for example, an algorithm adapted from that described in relation with FIG. 2, is considered. The cipher algorithm is assumed to comprise a number N of rounds. The rounds are, hereafter, numbered from 1 to N. In this example, the initialization step (21, FIG. 2) is not taken into account.

FIG. 4 shows:

by blocks in full line, forming a first row (KEY PATH), the successive applications of the round function to the secret key;

by blocks in dotted lines, forming a second row (DATA PATH SHARE 1), the successive applications of the round function to a first data share, for example, masked data X0;

by blocks in dotted lines, forming a third row (DATA PATH SHARE 2), the successive applications of the round function to a second data share, for example, first data mask R1; and by blocks in dotted lines, forming a fourth row (DATA PATH SHARE 3), the successive applications of the round function to a third data share, for example, second data mask R2.

In the example of FIG. 4, each block thus represents an application of the round function to the key and to the blocks forming a data share (among masked data X0 and data masks R1 and R2). The applications of the round function to the key and the applications of the round function to each data share X0, R1, and R2 are, still in this example, performed by four different hardware entities (not shown). In other words, a hardware entity is assigned to the calculation of the subkey specific to each round while three other separate hardware entities are dedicated to the ciphering of the three data shares X0, R1, and R2. A separation, called spatial separation, of the execution of the cipher algorithm is thus achieved within the circuit.

At a time t0, a first round of the cipher algorithm starts. The hardware entity dedicated to the calculation of the subkeys applies (block 301) the round function to the secret key. A first subkey is thus obtained. The three hardware entities dedicated to the ciphering of data shares X0, R1, and R2 remain generally inactive during the calculation 301 of the first subkey.

At a time t1, the round function is simultaneously applied (blocks 511, 531, and 551) to masked data X0 and to the two data masks R1 and R2 by the hardware entities dedicated to the ciphering of data shares X0, R1, and R2. This thus enables to perform first ciphering 511, 531, and 551 of data shares X0, R1, and R2 by using the first subkey resulting from calculation 301. Once the first cipher operations 511, 531, and 551 are over, the first round of the algorithm ends. In parallel with the execution of first round 511, 531, and 551 applied to the data shares, a second round of the cipher algorithm starts by the application (block 303) of the round function to the first subkey resulting from calculation 301. A second subkey is thus obtained.

At a time t2, the round function is simultaneously applied (blocks 513, 533, and 553) to the data shares originating from the first operations of ciphering 511, 531, and 551, by means of the first subkey, of data shares X0, R1, and R2. This thus enables to perform second operations of ciphering 513, 533, and 553 of data shares X0, R1, and R2 by using the second subkey resulting from calculation 303. Once the second cipher operations 513, 533, and 553 are over, the second round of the algorithm ends. In parallel with the execution of second round 513, 533, and 553 applied to the data shares, a third round of the cipher algorithm starts by the application (block 305) of the round function to the second subkey resulting from calculation 303. A third subkey is thus obtained.

At a time t3, the round function is simultaneously applied (blocks 515, 535, and 555) to the data shares originating from the second operations of ciphering 513, 533, and 553, by means of the second subkey, of the data shares. This thus enables to perform third operations of ciphering 515, 535, and 555 of data shares X0, R1, and R2 by using the third subkey resulting from calculation 305. Once the third cipher operations 515, 535, and 555 are over, the third round of the algorithm ends. In parallel with the execution of third round 515, 535, and 555 applied to the data shares, a fourth round of the cipher algorithm starts by the application (not shown) of the round function to the third subkey resulting from calculation 305. A fourth subkey is thus obtained.

The steps of execution of the cipher algorithm thus follow one another until a time t4 when the last (N-th) subkey is calculated (block 307).

At a time t5, the recursive ciphering process ends by a final simultaneous application (blocks 517, 537, and 557) of the round function to each data share X0, R1, and R2. The data shares obtained at the end of these last cipher operations 517, 537, and 557, by means of the N-th key, then form three ciphered data shares. The hardware entity assigned to the calculation of the subkeys remains generally inactive during the last applications 517, 537, and 557 of the round function to the data shares.

One notes, in the present example:
Y0 the result of the ciphering 517, at the end of the N rounds of the algorithm, of masked data X0;
Y1 the result of the ciphering 537, at the end of the N rounds of the algorithm, of first data mask R1; and
Y2 the result of the ciphering 557, at the end of the N rounds of the algorithm, of second data mask R2.

The ciphered data, noted Y, can then be extracted from the three data shares Y0, Y1, and Y2 resulting from the ciphering by the algorithm. It is assumed, in this example, that masked data X0 are obtained, from plain text X, by relation X0=X XOR R1 XOR R2. Ciphered data Y are then obtained from data shares Y0, Y1, and Y2 by applying the following relation: Y=Y0 XOR Y1 XOR Y2.

In the example of FIG. 4, the time sequence of the steps of the cipher algorithm extends over a time period theoretically equal to N+1 multiplied by the time taken for the application of the round function to a data share or to the key.

Figure 5:
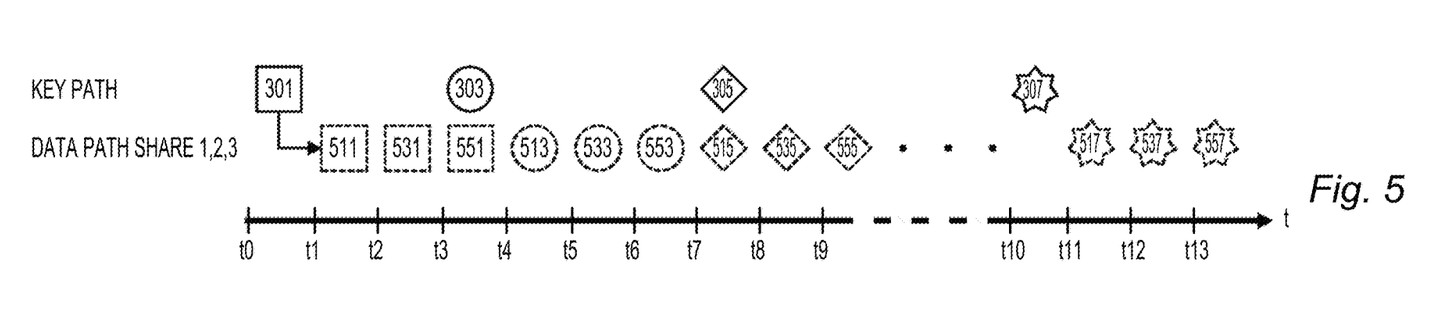
FIG. 5 schematically shows another example of a method of protection of the execution of a symmetric cipher algorithm.

FIG. 5 schematically shows another example of a method of protection of the execution of a symmetric cipher algorithm.

In the example of FIG. 5, the plain text is, as in the previous example discussed in relation with FIG. 4, first masked before being ciphered by the execution of the algorithm. The masking of the plain text is, for example, performed by combining plain text X with the two random numbers R1 and R2 by means of an XOR operator to form masked data X0: X0=X XOR R1 XOR R2. The three data shares X0, R1, and R2 are thus obtained.

A time variation of the steps of a symmetric cipher algorithm in rounds, for example, an algorithm adapted from that described in relation with FIG. 2, is considered. The cipher algorithm is assumed to comprise a number N of rounds. The rounds are, hereafter, numbered from 1 to N. In this example, the initialization step (21, FIG. 2) is not taken into account.

FIG. 5 shows:
by blocks in full line, forming a first row (KEY PATH), the successive applications of the round function to the secret key; and
by blocks in dotted lines, forming a second row (DATA PATH SHARE 1, 2, 3), the successive applications of the round function to the three data shares X0, R1, and R2.

In the example of FIG. 5, each block thus represents an application of the round function to the key or to the blocks forming data shares X0, R1, and R2. The applications of the round function to the key and the applications of the round function to data shares X0, R1, and R2 are, still in this example, performed by two different hardware entities (not shown). In other words, a hardware entity is assigned to the calculation of the subkey specific to each round while another separate hardware entity is dedicated to the ciphering of the three data shares X0, R1, and R2. A separation, called time separation, of the execution of the cipher algorithm is thus achieved.

At a time t0, a first round of the cipher algorithm starts. The hardware entity dedicated to the calculation of the subkeys applies (block 301) the round function to the secret key. A first subkey is thus obtained. The hardware entity dedicated to the ciphering of data shares X0, R1, and R2 remains generally inactive during the calculation 301 of the first subkey.

At a time t1, the round function is applied (block 511) to a first data share, for example, masked data X0, by the hardware entity dedicated to the ciphering of data shares This thus enables to perform a first ciphering 511 of masked data X0 by using the first subkey resulting from calculation 301. The hardware entity assigned to the calculation of the subkeys remains generally inactive during ciphering 511.

At a time t2, the round function is applied (block 531) to a second data share, for example, first data mask R1, by the hardware entity dedicated to the ciphering of the data shares. This thus enables to perform a first ciphering 531 of first data mask R1 by using the first subkey resulting from calculation 301. The hardware entity assigned to the calculation of the subkeys remains generally inactive during ciphering 531.

At a time t3, the round function is applied (block 551) to a third data share, for example, second data mask R2, by the hardware entity dedicated to the ciphering of the data shares. This thus enables to perform a first ciphering 551 of second data mask R2 by using the first subkey resulting from calculation 301. Once the first successive operations of ciphering 511, 531, and 551 of masked data X0, of first data mask R1, and of second data mask R2 are over, the first round of the algorithm ends. In parallel with the execution of first round 551 applied to the third data share, a second round of the cipher algorithm starts by the application (block 303) of the round function to the first subkey resulting from calculation 301. A second subkey is thus obtained.

At a time t4, the round function is applied (block 513) to the data share originating from the first ciphering 511, by means of the first subkey, of the first data share (in this example, masked data X0). This thus enables to perform a second ciphering 513 of masked data X0 by means of the second subkey resulting from calculation 303. The hardware entity assigned to the calculation of the subkeys remains generally inactive during ciphering 513.

At a time t5, the round function is applied (block 533) to the data share originating from the first ciphering 531, by means of the first subkey, of the second data share (in this example, first data mask R1). This thus enables to perform a second ciphering 533 of first data mask R1 by means of the second subkey resulting from calculation 303. The hardware entity assigned to the calculation of the subkeys remains generally inactive during ciphering 533.

At a time t6, the round function is applied (block 553) to the data share resulting from the first ciphering 551, by means of the first subkey, of the third data share (in this example, second data mask R2). This thus enables to perform a second ciphering 553 of second data mask R2 by means of the second subkey resulting from calculation 303. Once the second successive operations of ciphering 513, 533, and 553 of masked data X0, of first data mask R1, and of second data mask R2 are over, the second round of the algorithm ends. In parallel with the execution of second round 553 applied to the third data share, a third round of the cipher algorithm starts by the application (block 305) of the round function to the second subkey resulting from calculation 303. A third subkey is thus obtained.

At a time t7, the round function is applied (block 515) to the data share originating from the second ciphering 513, by means of the second subkey, of the first data share (in this example, masked data X0). This thus enables to perform a third ciphering 515 of masked data X0 by means of the third subkey resulting from calculation 305. The hardware entity assigned to the calculation of the subkeys remains generally inactive during ciphering 515.

At a time t8, the round function is applied (block 535) to the data share originating from the second ciphering 533, by means of the second subkey, of the second data share (in this example, first data mask R1). This thus enables to perform a third ciphering 535 of first data mask R1 by means of the third subkey resulting from calculation 305. The hardware entity assigned to the calculation of the subkeys remains generally inactive during ciphering 535.

At a time t9, the round function is applied (block 555) to the data share resulting from the second ciphering 553, by means of the second subkey, of the third data share (in this example, second data mask R2). This thus enables to perform a third ciphering 555 of second data mask R2 by means of the third subkey resulting from calculation 305. Once the third successive operations of ciphering 515, 535, and 555 of masked data X0, of first data mask R1, and of second data mask R2 are over, the third round of the algorithm ends. In parallel with the execution of third round 555 applied to the third data share, a fourth round of the cipher algorithm starts by the application (not shown) of the round function to the third subkey resulting from calculation 305. A fourth subkey is thus obtained.

The steps of execution of the cipher algorithm thus follow one another until a time t10 when the last (N-th) subkey is calculated (block 307).

At a time t11, the process of recursive ciphering of the first data share (in this example, masked data X0) ends with a final application (block 517) of the round function to the first data share.

At a time t12, the process of recursive ciphering of the second data share (in this example, first data mask R1) ends with a final application (block 537) of the round function to the second data share.

At a time t13, the process of recursive ciphering of the third data share (in this example, second data mask R2) ends with a final application (block 557) of the round function to the third data share.

The data shares obtained at the end of the last ciphering 557, by means of the N-th key, then form three ciphered data shares. The hardware entity assigned to the calculation of the subkeys remains generally inactive during the last three applications 517, 537, and 557 of the round function to the data shares X0, R1, and R2.

One notes, as in the previous example:
Y0 the result of the ciphering 517, at the end of the N rounds of the algorithm, of masked data X0;
Y1 the result of the ciphering 537, at the end of the N rounds of the algorithm, of first data mask R1; and
Y2 the result of the ciphering 557, at the end of the N rounds of the algorithm, of second data mask R2.

The ciphered data, noted Y, can then be extracted from the three data shares Y0, Y1, and Y2 resulting from the ciphering by the algorithm. It is assumed, still in this example, that masked data X0 are obtained, from plain text X, by relation X0=X XOR R1 XOR R2. Ciphered data Y are then obtained from data shares Y0, Y1, and Y2 by applying the following relation: Y=Y0 XOR Y1 XOR Y2.

In the example of FIG. 5, the time sequence of the steps of the cipher algorithm extends over a time period theoretically equal to 3*N+1 multiplied by the time taken for the application of the round function to a data share or to the key.

Executions similar to those which have just been described in relation with FIGS. 3, 4, and 5 are deemed vulnerable to side-channel attacks. It has been seen that only the hardware entity in charge of the calculation of the subkeys is active at the beginning of the execution of the algorithm, the hardware entity or entities dedicated to the ciphering of data X or of data shares X0, R1, and R2 generally remaining inactive at the start. This is likely to inform an attacker or hacker of a beginning of execution of cipher operations within a circuit, for example, circuit 1 (FIG. 1).

It has similarly been seen that the hardware entity or entities in charge of the application of the round function to data X or to data shares X0, R1, and R2 are particularly active during the final step of the algorithm, the hardware entity or entities assigned to the calculation of the subkeys generally remaining inactive during this step. This is likely to inform an attacker or hacker of an end of execution of cipher operations within a circuit, for example, circuit 1 (FIG. 1).

Generally, the fact for certain hardware entities to remain inactive while other hardware entities perform calculations or transformations may inform the attacker about the operations and/or the data manipulated by the circuit executing the cipher algorithm.

Figure 6:
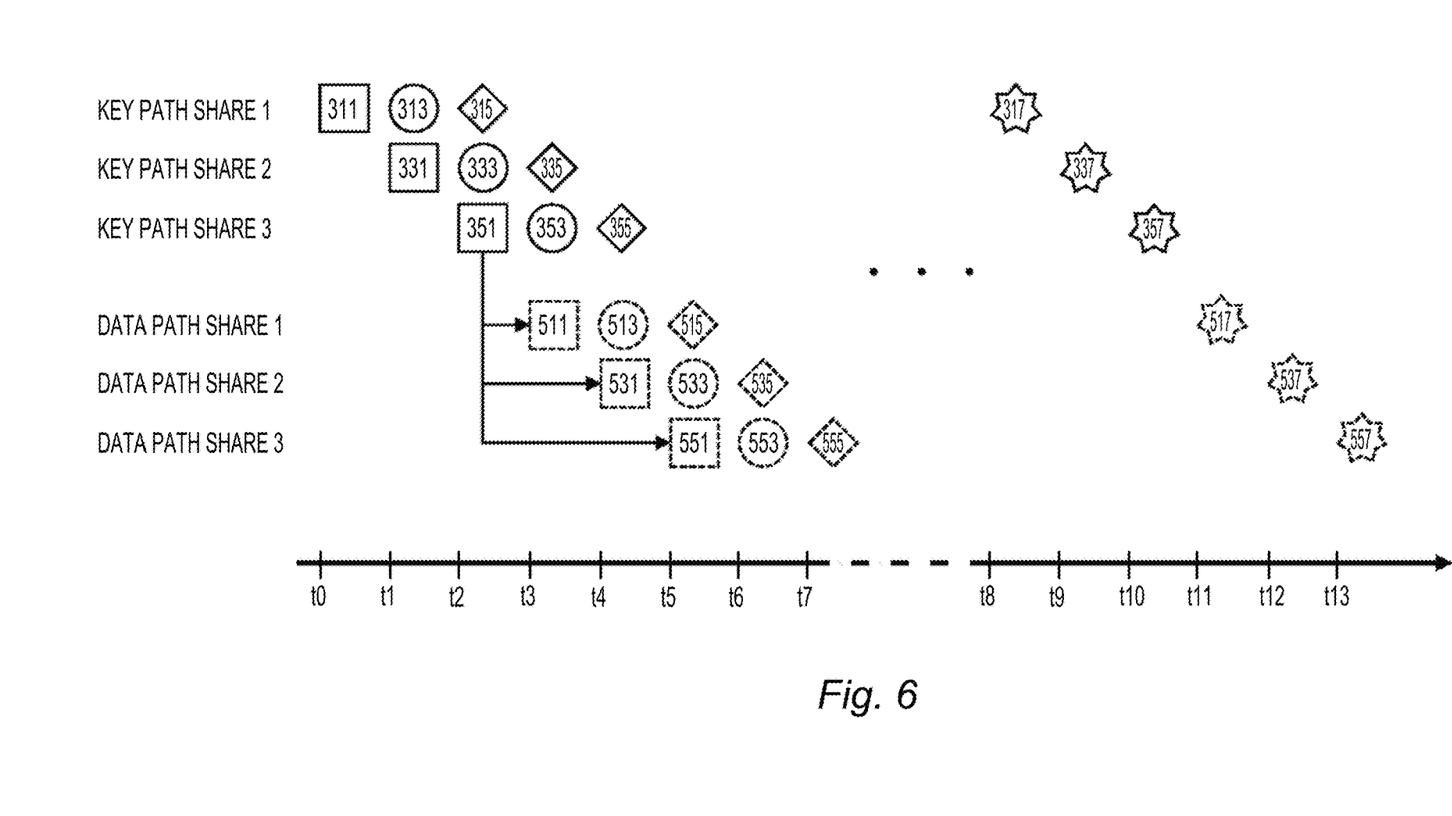
FIG. 6 schematically shows an implementation mode of a method of protection of the execution of a symmetric cipher algorithm.

FIG. 6 schematically shows an implementation mode of a method of protection of the execution of a symmetric cipher algorithm.

According to this implementation mode, not only the data (as discussed in relation with FIGS. 4 and 5), but also the secret key, are masked. Such a masking of the secret key is performed like the masking of the data. The secret key, noted K, is, for example, combined with two numbers, noted R3 and R4. Numbers R3 and R4 may be randomly selected. The masking of the secret key with random numbers R3 and R4 enables to secure the execution of the cipher algorithm by avoiding directly manipulating secret key K.

The three key shares, defined as follows, are thus obtained:

a masked key, noted K0, obtained by combination of or a logic operation involving the secret key K with one or both random numbers R3 and R4 (for example, K0=K XOR R3 XOR R4, where "XOR" designates the exclusive or operator);

a first key mask, equal to random number R3; and a second key mask, equal to random number R4.

It is assumed that plain text X is also masked by two random data masks R1 and R2, thus forming masked data X0 as discussed in relation with FIGS. 4 and 5. In this example, two masks are applied to the data and two masks are applied to the key. This corresponds to a so-called "second order masking". Other cases where one or a plurality of masks are used to mask the data and/or the key can also be imagined.

A time variation of the steps of a symmetric cipher algorithm in rounds, for example, an algorithm adapted from that described in relation with FIG. 2, is considered. The cipher algorithm is assumed to comprise a number N of rounds. The rounds are, hereafter, numbered from 1 to N. In this example, the initialization step (21, FIG. 2) is not taken into account.

FIG. 6 shows:

by blocks in full lines, forming a first row (KEY PATH SHARE 1), the successive applications of the round function to a first key share, for example, masked key K0;

by blocks in full lines, forming a second row (KEY PATH SHARE 2), the successive applications of the round function to a second key share, for example, first key mask R3;

by blocks in full lines, forming a third row (KEY PATH SHARE 3), the successive applications of the round function to a third key share, for example, second key mask R4;

by blocks in dotted lines, forming a fourth row (DATA PATH SHARE 1), the successive applications of the round function to a first data share, for example, masked data X0;

by blocks in dotted lines, forming a fifth row (DATA PATH SHARE 2), the successive applications of the round function to a second data share, for example, first data mask R1; and by blocks in dotted lines, forming a sixth row (DATA PATH SHARE 3), the successive applications of the round function to a third data share, for example, second data mask R2.

In the example of FIG. 6, each block thus represents an application of the round function to a key share (among masked key K0 and key masks R3 and R4) or to the blocks forming a data share (among masked data X0 and data masks R1 and R2). The applications of the round function to each key share K0, R3, and R4 and the applications of the round function to each data share X0, R1, and R2 are, still in this example, performed by six different hardware entities (not shown). In other words, the hardware entities are assigned to the calculation, starting from the three key shares K0, R3, and R4, of the three subkeys specific to each round while three other separate hardware entities are dedicated to the ciphering of the three data shares X0, R1, and R2. A separation, called spatial separation, of the execution of the cipher algorithm is thus achieved within the circuit.

At a time t0, a first round of the cipher algorithm starts. The first hardware entity dedicated to the calculation of the subkeys applies (block 311) the round function to a first key share, for example, masked key K0. A first subkey is thus obtained. The two hardware entities dedicated to the calculation of the other subkeys from the other key shares (key masks R3 and R4, in this example) as well as the three hardware entities dedicated to the ciphering of data shares X0, R1, and R2 remain generally inactive during the calculation 311 of the first subkey.

At a time t1, the second hardware entity dedicated to the calculation of the subkeys applies (block 331) the round function to a second key share, for example, first key mask R3. A second subkey is thus obtained. In parallel with the execution of calculation 331, a second round of the cipher algorithm starts by the application (block 313) of the round function to the first subkey resulting from calculation 311. A third subkey is thus obtained. The third hardware entity dedicated to the calculation of the subkey from the third key share (second key mask R4, in this example) as well as the three hardware entities dedicated to the ciphering of data shares X0, R1, and R2, remain inactive during calculation 331 of the second subkey and calculation 313 of the third subkey.

At a time t2, the third hardware entity dedicated to the calculation of the subkeys applies (block 351) the round function to a third key share, for example, second key mask R4. A fourth subkey is thus obtained. In parallel with the execution of calculation 351, the second hardware entity dedicated to the calculation of the subkeys applies (block 333) the round function to a second key share (first key mask R3 in this example). A fifth subkey is thus obtained. In parallel with the execution of calculations 351 and 333, a third round of the cipher algorithm starts by the application (block 315) of the round function to the third subkey resulting from calculation 313. A sixth subkey is thus obtained. The three hardware entities dedicated to the ciphering of data shares X0, R1, and R2 remain inactive during calculations 351, 333, and 315 of the fourth, fifth, and sixth subkeys, respectively.

At a time t3, the round function is applied (block 511) to a first data share, for example, masked data X0, by the hardware entity dedicated to the ciphering of the first data share. This thus enables to perform a first ciphering 511 of masked data X0 by using, for example, the first subkey resulting from calculation 311. In parallel with the execution of ciphering 511, the third hardware entity dedicated to the calculation of the subkeys applies (block 353) the round function to the fourth subkey resulting from calculation 351. A seventh subkey is thus obtained. In parallel with the execution of ciphering 511 and of calculation 353, the second hardware entity dedicated to the calculation of the subkeys applies (block 335) the round function to the fifth subkey resulting from calculation 333. An eighth subkey is thus obtained. The two hardware entities dedicated to the ciphering of the other data shares (data masks R1 and R2, in this example) remain inactive during ciphering 511 and calculations 353 and 335.

At a time t4, the round function is applied (block 531) to a second data share, for example, first data mask R1, by the hardware entity dedicated to the ciphering of the second data share. This thus enables to perform a first ciphering 531 of first data mask R1 by using, for example, the second subkey resulting from calculation 331. In parallel with the execution of ciphering 531, the round function is applied (block 513) to the data share originating from the first ciphering 511, by means of the first subkey, of the first data share (in this example, masked data X0). This thus enables to perform a second ciphering 513 of masked data X0 by using, for example, the third subkey resulting from calculation 313. In parallel with the execution of cipher operations 531 and 513, the third hardware entity dedicated to the calculation of the subkeys applies (block 355) the round function to the seventh subkey resulting from calculation 353. A ninth subkey is thus obtained. The third hardware entity dedicated to the calculation of the third data share (second data mask R2, in this example) remains inactive during cipher operations 531 and 513 and calculation 355.

At a time t5, the round function is applied (block 551) to a third data share, for example, second data mask R2, by the hardware entity dedicated to the ciphering of the third data share. This thus enables to perform a first ciphering 551 of second data mask R2 by using, for example, the fourth subkey resulting from calculation 351. In parallel with the execution of ciphering 551, the round function is applied (block 533) to the data share originating from the first ciphering 531, by means of the second subkey, of the second data share (in this example, first data mask R1). This thus enables to perform a first ciphering 533 of first data mask R1 by using, for example, the fifth subkey resulting from calculation 333. In parallel with the execution of cipher operations 531 and 533, the round function is applied (block 515) to the data share originating from the second ciphering 513, by means of the third subkey, of the first data share (in this example, masked data X0). This thus enables to perform a third ciphering 515 of masked data X0 by using, for example, the sixth subkey resulting from calculation 315.

At a time t6, the round function is applied (block 553) to the data share resulting from first ciphering 551, by means of the fourth subkey, of the third data share (in this example, second data mask R2). This thus enables to perform a second ciphering 553 of second data mask R2 by using, for example, the seventh subkey resulting from calculation 353. In parallel with the execution of ciphering 553, the round function is applied (block 535) to the data share resulting from the second ciphering 533, by means of the fifth subkey, of the second data share (in this example, first data mask R1). This thus enables to perform a third ciphering 535 of first data mask R1 by using, for example, the eighth subkey resulting from calculation 335.

At a time t7, the round function is applied (block 555) to the data share originating from the second ciphering 553, by means of the seventh subkey, of the third data share (in this example, second data mask R2). This thus enables to perform a third ciphering 555 of second data mask R2 by using, for example, the ninth subkey resulting from calculation 355.

The steps of execution of the cipher algorithm thus follow one another until a time t8 when a last (N-th) round of the cipher algorithm starts. The first hardware entity dedicated to the calculation of the subkeys then calculates (block 317) an antepenultimate subkey.

At a time t9, the second hardware entity dedicated to the calculation of the subkeys then calculates (block 337) a penultimate subkey. The first hardware entity dedicated to the calculation of the subkeys remains inactive during calculation 337 of the penultimate subkey.

At a time t10, the third hardware entity dedicated to the calculation of the subkeys then calculates (block 357) a last subkey. The two other hardware entities dedicated to the calculation of the subkeys remain inactive during calculation 357 of this last subkey.

At a time t11, the round function is applied (block 517) by the hardware entity dedicated to the ciphering of the first data share (masked data X0, in this example). This thus enables to perform a final ciphering 517 of masked data X0 by using, for example, the antepenultimate subkey resulting from calculation 317. The three hardware entities dedicated to the calculation of the subkeys remain inactive during final ciphering 517 of the first data share.

At a time t12, the round function is applied (block 537) by the hardware entity dedicated to the ciphering of the second data share (first data mask R1 in this example). This thus enables to perform a final ciphering 537 of first data mask R1 by using, for example, the penultimate subkey resulting from calculation 337. The three hardware entities dedicated to the calculation of the subkeys and the hardware entity dedicated to the ciphering of the first data share remain inactive during final ciphering 537 of the second data share.

At a time t13, the round function is applied (block 557) by the hardware entity dedicated to the ciphering of the third data share (second data mask R2 in this example). This thus enables to perform a final ciphering 557 of second data mask R2 by using, for example, the last subkey resulting from calculation 357. The three hardware entities dedicated to the calculation of the subkeys and the two other hardware entities respectively dedicated to the ciphering of the first and of the second data shares remain inactive during final ciphering 557 of the third data share.

The data shares obtained at the end of last ciphering 557, by means of the last key, then form three ciphered data shares.

One notes, as in the previous example:

Y0 the result of the ciphering 517, at the end of the N rounds of the algorithm, of masked data X0;

Y1 the result of the ciphering 537, at the end of the N rounds of the algorithm, of first data mask R1; and Y2 the result of the ciphering 557, at the end of the N rounds of the algorithm, of second data mask R2.

The ciphered data, noted Y, can then be extracted from the three data shares Y0, Y1, and Y2 resulting from the ciphering by the algorithm. It is assumed, still in this example, that masked data X0 are obtained, from plain text X, by relation X0=X XOR R1 XOR R2. Ciphered data Y are then obtained from data shares Y0, Y1, and Y2 by applying the following relation: Y=Y0 XOR Y1 XOR Y2.

In the example of FIG. 6, the time sequence of the steps of the cipher algorithm extends over a time period theoretically equal to N+5 multiplied by the time taken for the application of the round function to a data share or to a key share.

According to this implementation mode, it is first awaited to have finished calculating all the subkeys specific to a round of same rank before starting ciphering, still in this round, the blocks of the data shares.

Figure 7:
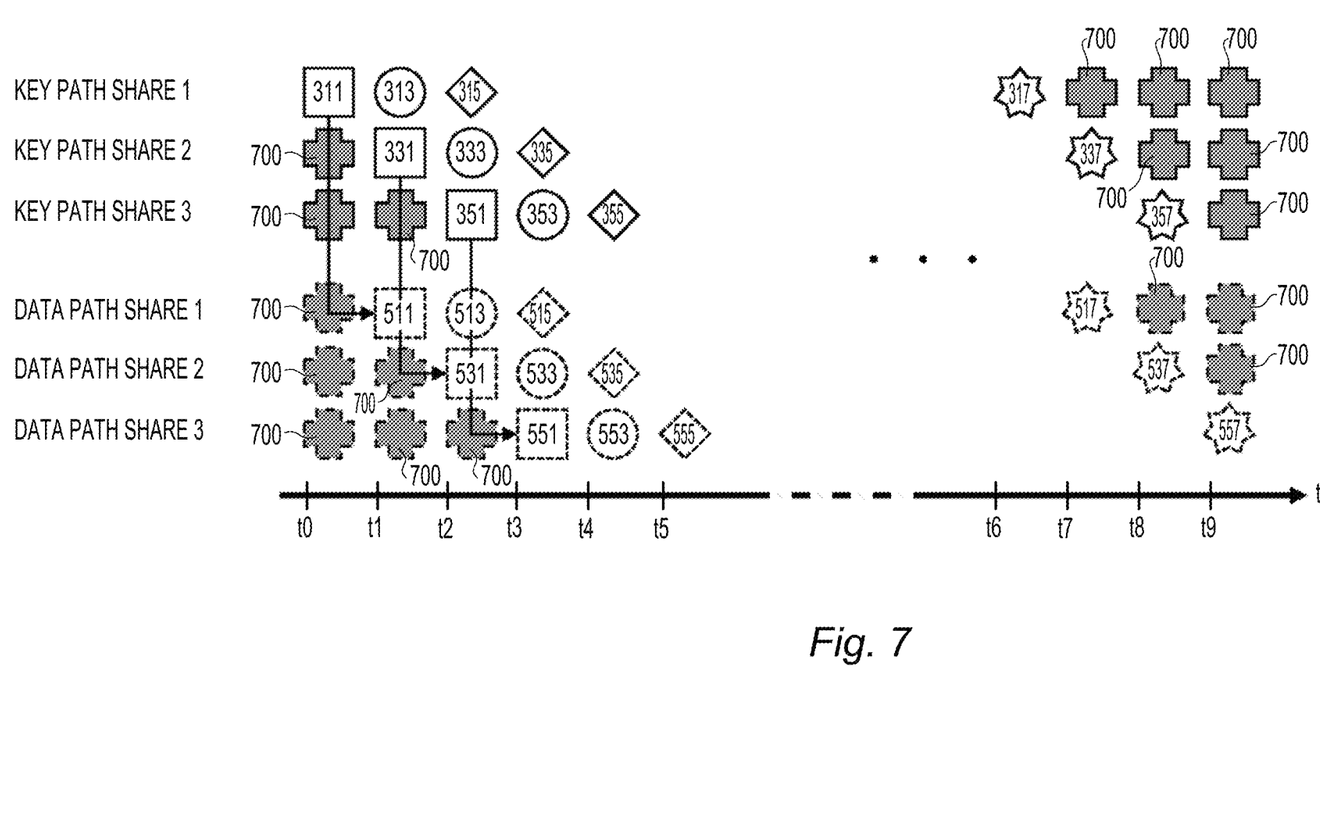
FIG. 7 schematically shows another implementation mode of a method of protection of the execution of a symmetric cipher algorithm.

FIG. 7 schematically shows another implementation mode of a method of protection of the execution of a symmetric cipher algorithm.

The embodiment discussed hereabove in relation with FIG. 7 comprises elements common with the embodiment previously discussed in relation with FIG. 6. The common elements will not be detailed again hereafter.

The embodiment discussed in relation with FIG. 7 differs from the embodiment discussed in relation with FIG. 6 mainly in that the ciphering of each data share occurs, for a round of same rank, immediately after the calculation of the associated subkey. In other words, the round function is, for a round of same rank, alternately applied to a key share K0, R3, R4, and then to a data share X0, R1, R2.

At the first round of the cipher algorithm, calculations 311, 331, and 351 of the first three subkeys, from key shares K0, R3, and R4, are successively performed at times t0, t1, and t2. The operations of ciphering 511, 531, and 551 of the blocks of data shares X0, R1, and R2 then respectively take place at times t1 and t2 and at a time t3. Cipher operations 511, 531, and 551 respectively use the subkeys resulting from calculations 311, 331, and 351.

At the second round of the cipher algorithm, the calculations 313, 333, and 353 of the next three subkeys, from the subkeys respectively resulting from calculations 311, 331, and 351, are successively performed at times t1, t2, and t3. The operations of ciphering 513, 533, and 553 of the blocks resulting from cipher operations 511, 531, and 551 then respectively take place at times t2 and t3 and at a time t4. Cipher operations 513, 533, and 553 respectively use the subkeys resulting from calculations 313, 333, and 353.

At the third round of the cipher algorithm, calculations 315, 335, and 355 of the next three subkeys, from the subkeys respectively resulting from calculations 313, 333, and 353, are successively performed at times t2, t3, and t4. The operations of ciphering 515, 535, and 555 of the blocks originating from cipher operations 513, 533, and 553 then respectively take place at times t3 and t4 and at a time t5. Cipher operations 515, 535, and 555 respectively use the subkeys resulting from calculations 315, 335, and 355.

The rounds of the cipher algorithm then follow one another until a last (N-th) round of the cipher algorithm.

The calculations 317, 337, and 357 of the last three subkeys, obtained from the calculations (not shown) of the subkeys of the previous round, are successively performed at times t6, t7, and t8. The operations of ciphering 517, 537, and 557 of the blocks resulting from the cipher operations (not shown) of the previous round then respectively take place at times t7 and t8 and at a time t9. Cipher operations 517, 537, and 557 respectively use the subkeys resulting from calculations 317, 337, and 357.

In the example of FIG. 7, the time sequence of the steps of the cipher algorithm extends over a time period theoretically equal to N+3 multiplied by the time taken for the application of the round function to a data share or to a key share.

When a hardware entity is not involved to calculate a subkey or cipher data blocks, the entity may perform an arbitrarily or randomly determined calculation 700, also referred to herein as a dummy operation. Calculation 700 is independent from the execution of the cipher algorithm. According to the embodiment of FIG. 7, all the hardware entities thus remain simultaneously active all along the duration of execution of the cipher algorithm (that is, from time t0 when calculation 311 starts to a time (not shown) when the last ciphering 557 ends). For a given period of time in which a round function is performed by a first hardware entity to generate a data share or a key share, one or more other hardware entities may perform a dummy operation in parallel with performance of the round function by the first hardware entity to obfuscate secret data associated with operation of the circuit 1 or portions thereof.

Calculation 700 particularly enables each hardware entity to maintain a substantially constant or stable electric power consumption and electromagnetic radiation all along the duration of execution of the cipher algorithm. A circuit executing this algorithm, for example, circuit 1 (FIG. 1), is thus protected against possible side channelside-channel attacks.

The execution of the algorithm according to the embodiment discussed in relation with FIG. 7 also has the advantage of comprising up to six simultaneous executions, in parallel. This greatly complicates a task of identification, by an attacker analyzing the execution of the algorithm by circuit 1, of the manipulated data and/or keys, all the more as the data and the keys have been previously masked. It is thus theoretically impossible to trace back the data and/or keys manipulated by the algorithm by recombining information originating from the analysis of its execution by circuit 1.

Figure 8:
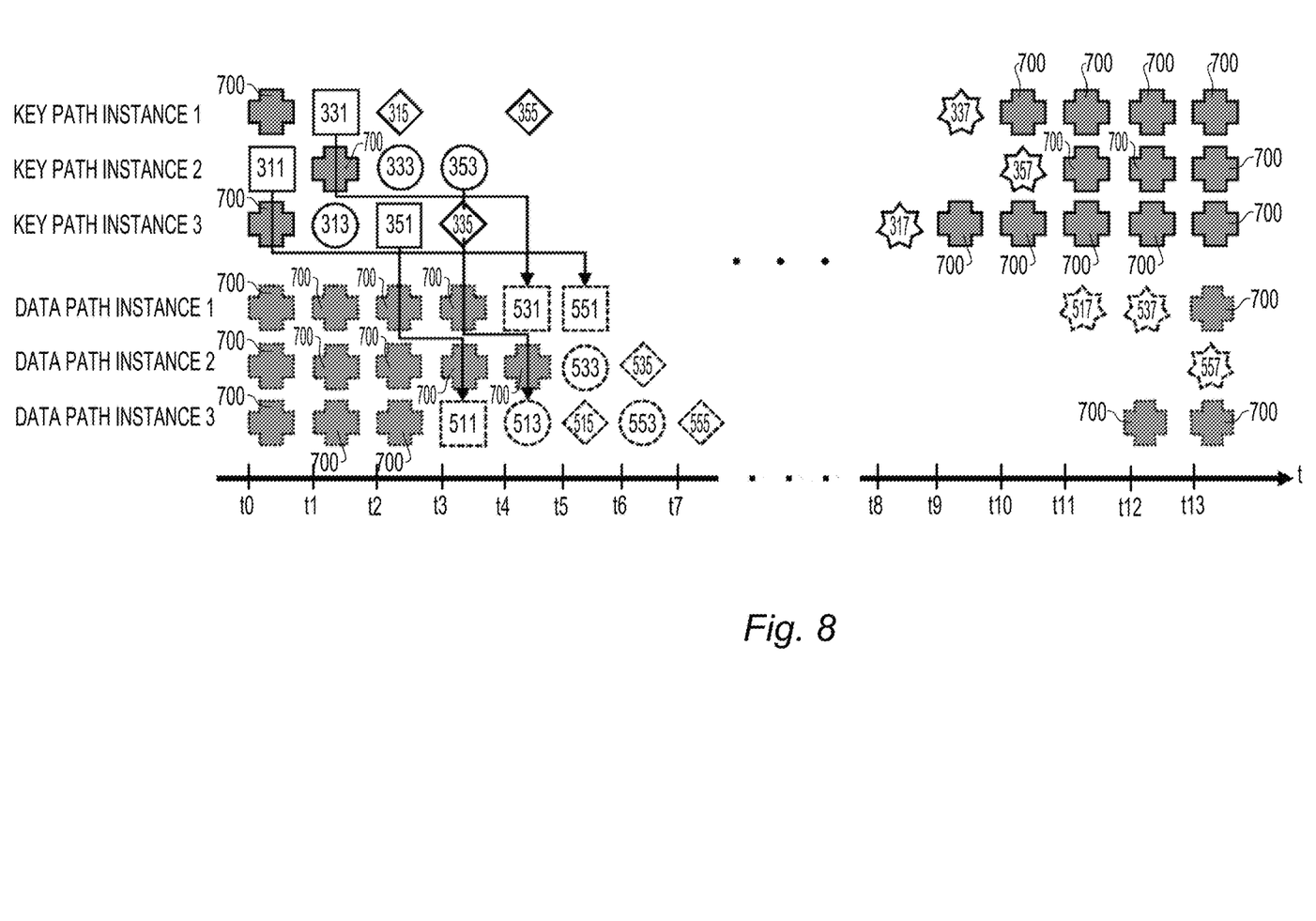
FIG. 8 schematically shows still another implementation mode of a method of protection of the execution of a symmetric cipher algorithm.

FIG. 8 schematically shows still another embodiment of a method of protection of the execution of a symmetric cipher algorithm.

In an embodiment, discussed hereafter in relation with FIG. 8, comprises elements common with the embodiment previously discussed in relation with FIG. 7. The common elements will not be detailed again hereafter.

The embodiment discussed in relation with FIG. 8 differs from the embodiment discussed in relation with FIG. 7 mainly in that the hardware entities applying the round function are, at each round of the cipher algorithm, randomly selected. Further, the key share used to cipher each data share is, at each round of the cipher algorithm, randomly selected. In other words, the subkey used, at a round of same rank, to cipher one or a plurality of blocks originating from a same data share X0, R1, or R2, is randomly selected from the three subkeys originating from the three key shares K0, R3, and R4.

According to this embodiment, it is first awaited to have finished calculating all the subkeys specific to a round of same rank before starting ciphering, still in this round, the blocks originating from data shares X0, R1, and R2.

FIG. 8 shows:

by blocks in full lines, forming a first row (KEY PATH INSTANCE 1), the successive applications of the round function by a first hardware entity dedicated to the calculation of the subkeys from the key shares;

by blocks in full lines, forming a second row (KEY PATH INSTANCE 2), the successive applications of the round function by a second hardware entity dedicated to the calculation of the subkeys from the key shares;

by blocks in full lines, forming a third row (KEY PATH INSTANCE 3), the successive applications of the round function by a third hardware entity dedicated to the calculation of the subkeys from the key shares;

by blocks in dotted lines, forming a fourth row (DATA PATH INSTANCE 1), the successive applications of the round function by a first hardware entity dedicated to the ciphering of the blocks of the data shares;

by blocks in dotted lines, forming a fifth row (DATA PATH INSTANCE 2), the successive applications of the round function by a second hardware entity dedicated to the ciphering of the blocks of the data shares; and by blocks in dotted lines, forming a sixth row (DATA PATH INSTANCE 3), the successive applications of the round function by a third hardware entity dedicated to the ciphering of the blocks of the data shares.

At the first round of the cipher algorithm, the calculation 311 of the first subkey is performed, at a time t0, by a hardware entity dedicated to the calculation of the randomly-selected subkeys, for example, the second unit dedicated to the calculation of the subkeys. The first subkey, for example, originates from masked key K0.

Calculation 331 of the second subkey is performed, at a time t1, by a randomly-selected hardware entity dedicated to the calculation of the subkeys, for example, the first unit dedicated to the calculation of the subkeys. The second subkey, for example, originates from first key mask R3.

Calculation 351 of the third subkey is performed, at a time t2, by a randomly-selected hardware entity dedicated to the calculation of the subkeys, for example, the third unit dedicated to the calculation of the subkeys. The third subkey, for example, originates from second key mask R4.

The first ciphering 511 of the first data share, for example, masked data X0, is then performed, at a time t3, by a randomly-selected hardware entity dedicated to the ciphering, for example, the third unit dedicated to the ciphering. Ciphering 511 uses a randomly-selected subkey, for example, the third subkey resulting from calculation 351.

The first ciphering 531 of the first data share, for example, first data mask R1, is then performed, at a time t4, by a randomly-selected hardware entity dedicated to the ciphering, for example, the first unit dedicated to the ciphering. Ciphering 531 uses a randomly-selected subkey, for example, the second subkey resulting from calculation 331.

The first ciphering 551 of the third data share, for example, second data mask R2, is then performed, at a time t5, by a randomly-selected hardware entity dedicated to the ciphering, for example, the first unit dedicated to the ciphering. Ciphering 551 uses a randomly selected subkey, for example, the first subkey resulting from calculation 311. The first round of the algorithm ends after ciphering 551.

At the second round of the cipher algorithm, the calculation 313 of the fourth subkey is performed, at a time t1, by a hardware entity dedicated to the calculation of the randomly-selected subkeys, for example, the third unit dedicated to the calculation of the subkeys. The fourth subkey, in this example, originates from masked key K0.

Calculation 333 of the fifth subkey is performed, at time t2, by a randomly-selected hardware entity dedicated to the calculation of the subkeys, for example, the second unit dedicated to the calculation of the subkeys. In this example, the fifth subkey originates from first key mask R3.

Calculation 353 of the sixth subkey is performed, at time t3, by a randomly-selected hardware entity dedicated to the calculation of the subkeys, for example, the second unit dedicated to the calculation of the subkeys. In this example, the sixth subkey originates from second key mask R4.

The second ciphering 513 of the first data share (masked data X0 in this example) is then performed, at a time t4, by a randomly-selected hardware entity dedicated to the ciphering, for example, the third unit dedicated to the ciphering. Ciphering 513 uses a randomly-selected subkey, for example, the sixth subkey resulting from calculation 353.

The second ciphering 533 of the second data share (first data mask R1 in this example) is then performed, at a time t5, by a randomly-selected hardware entity dedicated to the ciphering, for example, the second unit dedicated to the ciphering. Ciphering 533 uses a randomly-selected subkey, for example, the fourth subkey resulting from calculation 313.

The second ciphering 553 of the third data share (second data mask R2 in this example) is then performed, at a time t6, by a randomly-selected hardware entity dedicated to the ciphering, for example, the third unit dedicated to the ciphering. Ciphering 553 uses a randomly selected subkey, for example, the fifth subkey resulting from calculation 333. The second round of the algorithm ends after ciphering 553.

At the third round of the cipher algorithm, the calculation 315 of the seventh subkey is performed, at time t2, by a hardware entity dedicated to the calculation of the randomly-selected subkeys, for example, the first unit dedicated to the calculation of the subkeys. The seventh subkey, in this example, originates from masked key K0.

Calculation 335 of the eighth subkey is performed, at time t3, by a randomly-selected hardware entity dedicated to the calculation of the subkeys, for example, the third unit dedicated to the calculation of the subkeys. In this example, the eighth subkey originates from first key mask R3.

Calculation 355 of the ninth subkey is performed, at time t4, by a randomly-selected hardware entity dedicated to the calculation of the subkeys, for example, the first unit dedicated to the calculation of the subkeys. In this example, the ninth subkey originates from second key mask R4.

The third ciphering 515 of the first data share (masked data X0 in this example) is then performed, at a time t5, by a randomly-selected hardware entity dedicated to the ciphering, for example, the third unit dedicated to the ciphering. Ciphering 515 uses a randomly-selected subkey, for example, the seventh subkey resulting from calculation 315.

The third ciphering 535 of the second data share (first data mask R1 in this example) is then performed, at a time t6, by a randomly-selected hardware entity dedicated to the ciphering, for example, the second unit dedicated to the ciphering. Ciphering 535 uses a randomly-selected subkey, for example, the ninth subkey resulting from calculation 355.

The third ciphering 555 of the third data share (second data mask R2 in this example) is then performed, at a time t7, by a randomly-selected hardware entity dedicated to the ciphering, for example, the third unit dedicated to the ciphering. Ciphering 555 uses a randomly selected subkey, for example, the eighth subkey resulting from calculation 335. The third round of the algorithm ends after ciphering 555.

The rounds of the cipher algorithm then follow one another until a last (N-th) round of the cipher algorithm.

At the N-th round of the cipher algorithm, the calculation 317 of the antepenultimate subkey is performed, at a time t8, by a hardware entity dedicated to the calculation of the randomly-selected subkeys, for example, the third unit dedicated to the calculation of the subkeys. The antepenultimate subkey, in this example, originates from masked key K0.

Calculation 337 of the penultimate subkey is performed, at a time t9, by a randomly-selected hardware entity dedicated to the calculation of the subkeys, for example, the first unit dedicated to the calculation of the subkeys. In this example, the penultimate subkey originates from first key mask R3.

Calculation 357 of the last subkey is performed, at a time t10, by a randomly-selected hardware entity dedicated to the calculation of the subkeys, for example, the second unit dedicated to the calculation of the subkeys. In this example, the last subkey originates from second key mask R4.

The last ciphering 517 of the first data share (masked data X0 in this example) is then performed, at a time t11, by a randomly-selected hardware entity dedicated to the ciphering, for example, the first unit dedicated to the ciphering. Ciphering 517 uses a randomly-selected subkey, for example, the penultimate subkey resulting from calculation 337.

The last ciphering 537 of the second data share (first data mask R1 in this example) is then performed, at a time t12, by a randomly-selected hardware entity dedicated to the ciphering, for example, the first unit dedicated to the ciphering. Ciphering 537 uses a randomly-selected subkey, for example, the last subkey resulting from calculation 357.

The last ciphering 557 of the third data share (second data mask R2 in this example) is then performed, at a time t13, by a randomly-selected hardware entity dedicated to the ciphering, for example, the second unit dedicated to the ciphering. Ciphering 557 uses a randomly selected subkey, for example, the antepenultimate subkey resulting from calculation 317. The last round of the algorithm ends after ciphering 557.

In the example of FIG. 8, the time sequence of the steps of the cipher algorithm extends over a time period theoretically equal to N+5 multiplied by the time taken for the application of the round function to a data share or to a key share.

According to the embodiment of FIG. 8, all the hardware entities remain simultaneously active all along the duration of execution of the cipher algorithm (that is, from time t0 when calculation 311 starts to a time (not shown) when the last ciphering 557 ends). When a hardware entity is not involved to calculate a subkey or to cipher data blocks, the entity may perform a calculation 700 independent from the execution of the cipher algorithm. The calculation 700 may be a dummy operation in which an operation is performed to generate arbitrary data that is unassociated with generation of cryptographic information. Calculation 700, for example, processes any data, random data, etc., which is not involved in the result of the ciphering (dummy computation). The same advantages as those described in relation with FIG. 7 are thus obtained.

The execution of the algorithm according to the embodiment discussed in relation with FIG. 8 further has the advantage of introducing a random character in the selection of the hardware entities used to calculate the subkeys and to cipher the data blocks. The subkeys, originating from key shares K0, R3, and R4, are also randomly used to cipher the data.

This greatly complicates a task of identification, by an attacker analyzing the execution of the algorithm by a circuit (for example, circuit 1 in FIG. 1), of the manipulated data and/or keys, all the more as the data and the keys have been previously masked. Fault-injection attacks or profiled attacks, comprising a training phase, are thus very difficult to implement. It is thus theoretically impossible to trace back the data and/or keys manipulated by the algorithm by recombining information originating from the analysis of its execution by the circuit 1.

For all the embodiments described in relation with FIGS. 6 to 8, it can be observed that the number of applications of the round function to a data share X0, R1, R2 is, at any time, smaller than the number of applications of the round function to a key share K0, R3, R4. It can similarly be observed that the number of applications of the round function to a data share X0, R1, R2 is, for a round of same rank, systematically smaller than or equal to the number of applications of the round function to a key share K0, R3, R4. In other words, a data share cannot be ciphered as long as the subkey used for the ciphering has not been calculated.

The embodiments described in relation with FIGS. 6 to 8 are compatible with any number of data masks R1, R2 and of key masks R3, R4, in other words, with any masking order. These embodiments may be applied to protect many encryption algorithms, among which AES- and SM4-type algorithms.

Various embodiments and variations have been described. It will be understood by those skilled in the art that certain features of these various embodiments, implementation modes, and variations, may be combined, and other variations will occur to those skilled in the art. For instance, the selection of the number of data masks R1, R2 used to mask plain text X, and of the number of key masks R3, R4 used to mask secret key K depends on the application and on the acceptable calculation time.

Some embodiments described herein may take the form of or comprise computer program products. For example, according to one embodiment there is provided a computer readable medium comprising a computer program adapted to perform one or more of the methods or functions described herein. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, convolutional accelerators, and including microcontrollers and/or embedded controllers), field-programmable gate arrays (FPGAs), complex programmable logic devices (CPLDs), etc., and various combinations thereof.

Finally, the practical implementation of the described embodiments, implementation modes, and variations is within the abilities of those skilled in the art based on the functional indications herein.

The various embodiments described above can be combined to provide further embodiments. Aspects of the embodiments can be modified, if desired to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   executing cryptographic operations to generate cryptographic information using cryptographic circuitry including a plurality of key paths and a plurality of data paths; and
   protecting the execution of the cryptographic operations and the secret data associated with the cryptographic operations, the protecting including:
   generating, by a first key path of the plurality of key paths, a first plurality of key shares by performing block cipher operations involving a cryptographic key;
   generating, by a second key path of the plurality of key paths, a second plurality of key shares by performing block cipher operations involving a first mask;
   generating, by a third key path of the plurality of key paths, a third plurality of key shares by performing block cipher operations involving a second mask;

generating, by a first data path of the plurality of data paths, a first plurality of data shares by performing block cipher operations involving a data block and the first plurality of key shares;

generating, by a second data path of the plurality of data paths, a second plurality of data shares by performing block cipher operations involving a third mask and the second plurality of key shares;

generating, by a third data path of the plurality of data paths, a third plurality of data shares by performing block cipher operations involving a fourth mask and the third plurality of key shares; and generating the cryptographic information by combining one data share of the first plurality of data shares, one data share of the second plurality of data shares, and one data share of the third plurality of data shares, wherein the cryptographic operations include operations in which key paths of the plurality of key paths generate key shares in parallel with generation of data shares by data paths of the plurality of data paths.

2. The method of claim 1, wherein the cryptographic key is a masked cryptographic key generated using the first mask and an unmasked cryptographic key, and the data block is masked data generated using the third mask.

3. The method of claim 1, wherein the parallel operations include:
operations associated with a same round; or
operations associated with a different round.

4. The method of claim 1, wherein the parallel operations include at least two operations of a same round and at least one operation of a different round.

5. The method of claim 1, wherein generating the second plurality of key shares is performed subsequent to generating an initial key share of the first plurality of key shares.

6. The method of claim 5, wherein generating an initial data share of the first plurality of data shares is performed subsequent to generating an initial key share of the second plurality of key shares.

7. The method of claim 5, wherein generating an initial data share of the first plurality of data shares is performed subsequent to generating the initial key share of the first plurality of key shares.

8. The method of claim 1, wherein one or more of the second plurality of key shares are generated in parallel with one or more of the first plurality of key shares.

9. The method of claim 8, wherein one or more of the second plurality of data shares are generated in parallel with one or more of the first plurality of data shares.

10. The method of claim 1, comprising:
performing, by the second key path in parallel with generating a key share of the first plurality of key shares by the first key path, a first dummy operation.

11. The method of claim 10, comprising:
performing, by the second data path in parallel with generating a data share of the first plurality of data shares by the first data path, a second dummy operation.

12. The method of claim 1, wherein the first plurality of key shares, the second plurality of key shares, and the third plurality of key shares are generated by randomly selected key paths of the plurality of key paths, and wherein the first plurality of data shares, the second plurality of data shares and the third plurality of data shares are generated by randomly selected data paths of the plurality of data paths.

13. A system, comprising:
memory; and
circuitry including a plurality of data paths and a plurality of key paths, the circuitry, in operation:
executes cryptographic operations to generate cryptographic information; and
protects the cryptographic operations, including protecting secret data associated with the cryptographic operations, the protecting including:
generating, using a first key path of the plurality of key paths, a first plurality of key shares by performing block cipher operations involving a masked cryptographic key;
generating, using a second key path of the plurality of key paths, a second plurality of key shares by performing block cipher operations involving a first mask;
generating, using a third key path of the plurality of key paths, a third plurality of key shares by performing block cipher operations involving a second mask;
generating, using a first data path of the plurality of data paths, a first plurality of data shares by performing block cipher operations involving data block and the first plurality of key shares;
generating, using a second data path of the plurality of data paths, a second plurality of data shares by performing block cipher operations involving a third mask and the second plurality of key shares;
generating, using a third data path of the plurality of data paths, a third plurality of data shares by performing block cipher operations involving a fourth mask and the third plurality of key shares; and
generating the cryptographic information by combining one data share of the first plurality of data shares, one data share of the second plurality of data shares, and one data share of the third plurality of data shares, wherein the cryptographic operations include operations in which key paths of the plurality of key paths generate key shares in parallel with generation of data shares by data paths of the plurality of data paths.

14. The system of claim 13, wherein the first plurality of key shares, the second plurality of key shares, and the third plurality of key shares are generated by randomly selected key paths of the plurality of key paths, and the first plurality of data shares, the second plurality of data shares, and the third plurality of data shares are generated by randomly selected data paths of the plurality of data paths.

15. The system of claim 13, wherein one or more individual paths of the circuitry are configured to perform a dummy operation in parallel with performance of a block cipher operation by at least one other path of the circuitry.

16. The system of claim 13, wherein a first key share of the first plurality of key shares is generated in parallel with a second key share of the second plurality of key shares, and a first data share of the first plurality of data shares is generated in parallel with a second data share of the second plurality of data shares.

17. The system of claim 13, wherein the parallel operations include:
operations associated with a same round; or
operations associated with a different round.

18. The system of claim 13, wherein the parallel operations include at least two operations of a same round and at least one operation of a different round.

19. A device, comprising:
processing circuitry including a plurality of three or more key paths and a plurality of three or more data paths, wherein the processing circuitry, in operation, performs iterative cypher operations on a data block, generating a plurality of data shares; and
output circuitry coupled to the processing circuitry, which, in operation, combines data shares of the plurality of data shares, generating ciphered data, wherein the processing circuitry and the output circuitry, in operation, protect the iterative cypher operations by,
generating, using a first key path of the plurality of key paths, a first plurality of key shares by performing block cipher operations involving a masked cryptographic key;
generating, using a second key path of the plurality of key paths, a second plurality of key shares by performing block cipher operations involving a first mask;
generating, using a third key path of the plurality of key paths, a third plurality of key shares by performing block cipher operations involving a second mask;
generating, using a first data path of the plurality of data paths, a first plurality of data shares by performing block cipher operations involving data block and the first plurality of key shares; generating, using a second data path of the plurality of data paths, a second plurality of data shares by performing block cipher operations involving a third mask and the second plurality of key shares;
generating, using a third data path of the plurality of data paths, a third plurality of data shares by performing block cipher operations involving a fourth mask and the third plurality of key shares; and
combining, using the output circuitry, one data share of the first plurality of data shares, one data share of the second plurality of data shares, and one data share of the third plurality of data shares, wherein the iterative cypher operations include operations in which key paths of the plurality of key paths generate key shares in parallel with generation of data shares by data paths of the plurality of data paths.

20. The device of claim 19, wherein, for each cycle of iterative cipher operations in which one or more paths of the processing circuitry perform cipher operations, remaining paths of the processing circuitry perform dummy operations in parallel with performance of the cipher operations by one or more paths.

21. The device of claim 19, wherein the first plurality of key shares, the second plurality of key shares, and the third plurality of key shares are generated by randomly selected key paths of the plurality of key paths, and wherein the first plurality of data shares, the second plurality of data shares, and the third plurality of data shares are generated by randomly selected data paths of the plurality of data paths.

22. The device of claim 19, wherein the parallel operations include operations associated with a same round.

23. The device of claim 19, wherein the parallel operations include operations associated with a different round.

24. The device of claim 23, wherein the parallel operations include operations associated with a same round.

* * * * *